US008669850B2

(12) United States Patent
Li et al.

(10) Patent No.: US 8,669,850 B2
(45) Date of Patent: Mar. 11, 2014

(54) METHOD FOR ADJUSTING THE TRANSMISSION TIME OF A CONTINUOUS WAVE AND READER THEREOF

(75) Inventors: Hui Li, Beijing (CN); Yong Yuan, Beijing (CN); Liang Zhang, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 290 days.

(21) Appl. No.: 13/003,736

(22) PCT Filed: Sep. 9, 2010

(86) PCT No.: PCT/EP2010/063254
§ 371 (c)(1),
(2), (4) Date: Jan. 11, 2011

(87) PCT Pub. No.: WO2011/036064
PCT Pub. Date: Mar. 31, 2011

(65) Prior Publication Data
US 2011/0181398 A1    Jul. 28, 2011

(30) Foreign Application Priority Data

Sep. 28, 2009   (CN) .......................... 2009 1 0177247

(51) Int. Cl.
*H04Q 5/22*    (2006.01)
(52) U.S. Cl.
USPC ....... 340/10.4; 340/10.1; 340/10.2; 340/10.3; 340/10.31; 340/10.32; 340/10.33; 340/10.34; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385

(58) Field of Classification Search
USPC ......................... 340/10.1–10.6, 572.1–572.9; 235/375–385
See application file for complete search history.

(56) References Cited

U.S. PATENT DOCUMENTS 2,247,024 A    6/1941   Hurley
3,706,940 A  * 12/1972  Hausner .......................... 331/76
(Continued)

FOREIGN PATENT DOCUMENTS

CN   101149783 A    3/2008
CN   101404057 A    4/2009
(Continued)

OTHER PUBLICATIONS

"Specification for RFID Air Interface. EPC™ Radio-Frequency Identity Protocols Class-1 Generation-2 UHF RFID Protocol for Communications at 860 MHz—960 MHz", Version 1.0.9, Jan. 31, 2005 http://www.gs1.org/sites/default/files/docs/uhfc1g2/uhfc1g2_1_0_9-standard-20050126.pdf.

(Continued)

*Primary Examiner* — George Bugg
*Assistant Examiner* — Paul Obiniyi
(74) *Attorney, Agent, or Firm* — Cozen O'Connor

(57) ABSTRACT

A reader and method for adjusting the transmission time of a continuous wave (CW), wherein the method comprises setting an initial value for a response waiting time, sending the CW to a tag after sending a command to the tag and waiting for a response from the tag, judging whether the response from the tag is received within the response waiting time. If the response from the tag is received within the response waiting time, then sending of the CW is stopped and the response waiting time is adjusted. If the response from the tag is still not received beyond the response waiting time, then sending of the CW is stopped. The time for the reader to wait for a response from the tag is far less than 20 ms. Consequently, a command failure can be found early, so as to improve the processing efficiency of an RFID system.

14 Claims, 1 Drawing Sheet

(56) References Cited

U.S. PATENT DOCUMENTS

| | | | |
|---|---|---|---|
| 4,506,361 A * | 3/1985 | Kume | 370/448 |
| 5,491,468 A * | 2/1996 | Everett et al. | 340/10.34 |
| 5,495,482 A * | 2/1996 | White et al. | 370/419 |
| 5,586,119 A * | 12/1996 | Scribano et al. | 370/350 |
| 5,821,877 A * | 10/1998 | Fallah | 340/10.42 |
| 6,317,027 B1 | 11/2001 | Watkins | |
| 6,501,741 B1 * | 12/2002 | Mikkonen et al. | 370/310 |
| 6,946,950 B1 * | 9/2005 | Ueno et al. | 340/10.1 |
| 6,995,652 B2 * | 2/2006 | Carrender et al. | 340/5.61 |
| 7,089,290 B2 * | 8/2006 | Hennessey et al. | 709/213 |
| 7,284,078 B2 * | 10/2007 | Fleury | 710/107 |
| 7,434,731 B2 * | 10/2008 | Cargonja et al. | 235/380 |
| 7,636,370 B2 * | 12/2009 | Yonge et al. | 370/445 |
| 7,716,160 B2 * | 5/2010 | Smith et al. | 340/10.2 |
| 7,716,208 B2 * | 5/2010 | Smith et al. | 707/713 |
| 7,728,714 B2 * | 6/2010 | Koo et al. | 340/10.4 |
| 7,756,505 B2 * | 7/2010 | Tanaka et al. | 455/333 |
| 7,760,073 B2 * | 7/2010 | Scott et al. | 340/10.1 |
| 7,840,240 B2 * | 11/2010 | Ohba et al. | 455/574 |
| RE42,751 E * | 9/2011 | Greeff et al. | 455/106 |
| 8,077,010 B2 * | 12/2011 | Kato | 340/5.61 |
| 8,134,452 B2 * | 3/2012 | Tuttle | 340/10.2 |
| 2003/0028626 A1 | 2/2003 | Hennessey et al. | 709/220 |
| 2006/0073804 A1 * | 4/2006 | Tanaka et al. | 455/333 |
| 2006/0145819 A1 * | 7/2006 | Scott et al. | 340/10.4 |
| 2006/0198387 A1 * | 9/2006 | Yonge et al. | 370/437 |
| 2007/0042763 A1 * | 2/2007 | Yeh | 455/418 |
| 2007/0120648 A1 * | 5/2007 | Koo et al. | 340/10.1 |
| 2008/0012689 A1 * | 1/2008 | Liu et al. | 340/10.1 |
| 2008/0024280 A1 | 1/2008 | Kato | |
| 2008/0290995 A1 * | 11/2008 | Bruns et al. | 340/10.1 |
| 2008/0297324 A1 * | 12/2008 | Tuttle | 340/10.33 |
| 2009/0085748 A1 | 4/2009 | Barnes et al. | |
| 2009/0144534 A1 | 6/2009 | Calhoon et al. | |
| 2010/0207739 A1 * | 8/2010 | Smith et al. | 340/10.4 |
| 2010/0246738 A1 * | 9/2010 | Bae et al. | 375/371 |
| 2010/0284380 A1 * | 11/2010 | Banerjee et al. | 370/338 |
| 2011/0037575 A1 * | 2/2011 | Horst et al. | 340/10.51 |
| 2012/0207143 A1 * | 8/2012 | Banerjee et al. | 370/338 |

FOREIGN PATENT DOCUMENTS

| | | | | |
|---|---|---|---|---|
| CN | 101499118 A | | 8/2009 | |
| EP | 1 770 665 | | 4/2007 | |
| EP | 1770665 A1 | | 4/2007 | |
| EP | 2247024 A1 | * | 11/2010 | H04W 12/06 |
| WO | WO 2009144534 A1 | * | 12/2009 | H04L 9/32 |

OTHER PUBLICATIONS

EPC Global: "Specification for RFID Air Interface. EPC (tm) Radio-Frequency Identity Protocols Class-1 Generation-2 UHF RFID Protocol for for Communications at 860 MHz—960 MHz (Version 1.0.9)", Internet Citation Jan. 31, 2005.

* cited by examiner

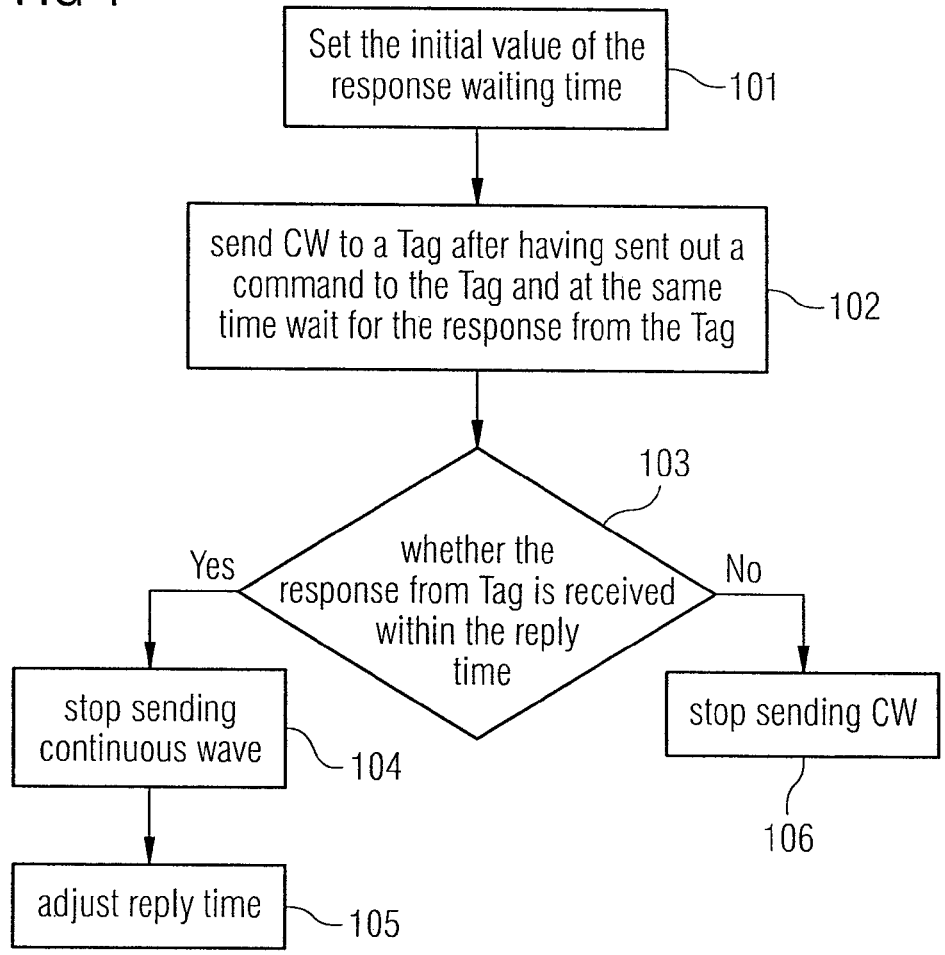
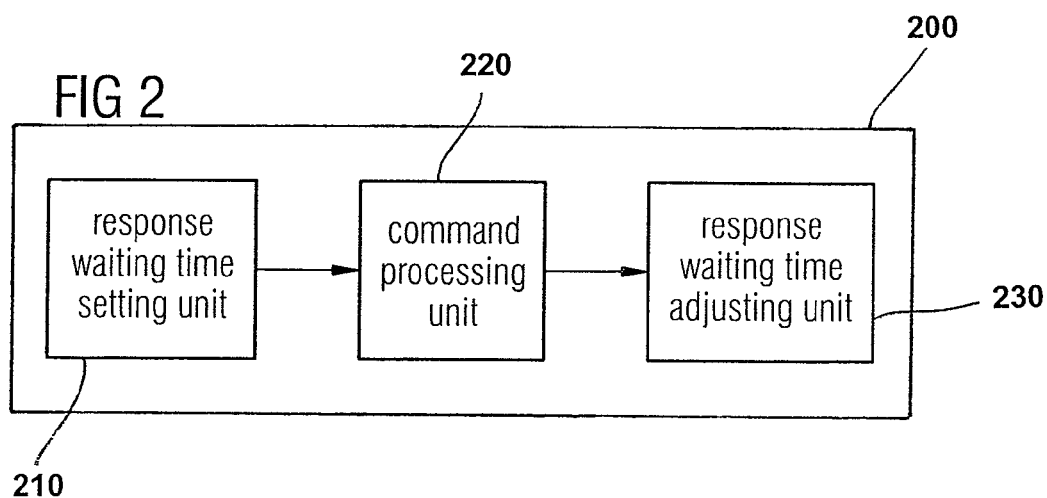

METHOD FOR ADJUSTING THE TRANSMISSION TIME OF A CONTINUOUS WAVE AND READER THEREOF

CROSS-REFERENCE TO RELATED APPLICATIONS

This is a U.S. national stage of International Application No. PCT/EP2010/063254, filed on 9 Sep. 2010. This patent application claims the priority of Chinese patent application 200910177247.X filed 28 Sep. 2009, the entire content of which application is incorporated herein by reference.

BACKGROUND OF THE INVENTION

1. Field of the Invention

The present invention relates to the field of radio frequency identification (RFID) and, more particularly, to a method for adjusting a transmission time of a continuous wave by a reader and the reader for implementing the method.

2. Description of the Related Art

In recent years, RFID technology has attracted more and more attention. Since hundreds of objects can be identified instantly by RFID technology, RFID technology can be applied to various application scenarios, such as logistics or manufacturing. However, in whatever application scenario, processing efficiency is always one of the important criteria for evaluating the performance of an RFID system.

According to the provisions of the protocol, EPC Radio-Frequency Identity Protocols Class-1 Generation-2 UHF RFID Protocol for Communications at 860 MHz-960 MHz Version 1.0.9, established by the worldwide EPC organization, EPC global, in an RFID system, when the distance between a tag and a reader is within the reading range of the reader, the reader will initiate a process to identify the identificatin (ID) of the tag. After having successfully identified the ID of the tag, the tag will enter into an open or secure state, and at this moment, the reader may send a corresponding command to the tag which is in the Open/Secure state to instruct it to perform a corresponding operation. For example, the reader can send a write command, a kill command, a lock command, a block-write command or a block-erase command to the tag which is in the Open/Secure state to instruct it to perform the corresponding write, kill, lock, block-write or block-erase operation. After having received one of the above-mentioned commands from the reader, the tag in the Open/Secure state will first perform a cyclic redundancy check (CRC) to the received command, and if the check is successful, then the tag will perform the operation corresponding to the received instruction and feeds back a response to the reader. If the check fails, however, then the tag will discard the received command and wait for a new command from the reader. Correspondingly, after having sent a command, the reader will further send a continuous wave (CW) to the tag in the Open/Secure state to provide energy needed by the tag to perform the corresponding operation and at the same time wait for a response from the tag. According to the provisions of the protocol, the longest time for a reader to wait for a response from a tag is 20 millisecond (ms). That is, if the reader receives a response from the tag within 20 ms after it has sent a command, then the reader stops sending the CW after having received the response from the tag. On the other hand, if the reader does not receive a response from the tag within 20 ms after it has sent the command, then the reader stops sending the CW immediately. After having stopped sending the CW, the reader may go on to send a new command to the tag in the Open/Secure state. For the sake of ease of description, the time period from the moment when the reader sends out a command to the moment when the reader receives a response from the tag can be referred to as the tag's response time $T_{REPLY}$. It can be found by statistics that, if both the reader and the tag operate at the highest transmission rate, the $T_{REPLY}$ is approximately 1.5 ms, which is far less than 20 ms. Even if the reader and the tag both have the lowest transmission rate, the $T_{REPLY}$ is approximately 7 ms, which is still far less than 20 ms.

It can be seen from the above-mentioned performance process that, after having sent out a command, if the reader does not receive a response from the tag, then it needs to wait for a period of 20 ms to then send out a new instruction. That is, after having sent out a command, the reader needs to send a CW up to 20 ms. Furthermore, in an RFID system, situations where a reader cannot correctly receive a response from a tag are still quite common. Since the response time of a tag is far less than 20 ms in normal situations, it causes a reader to wait for too long when it cannot receive a response from the tag, which seriously affects the processing efficiency of the RFID system.

SUMMARY OF THE INVENTION

It is therefore an object of the invention to provide a method for adjusting the transmission time of a continuous wave (CW) and a reader for implementing the method, so as to reduce the reader's waiting time when it cannot receive a response from a tag and to improve the processing efficiency of an RFID system.

This and other objects and advantages are achieved in accordance with the invention by a method for adjusting the transmission time of a CW in accordance with the present invention by setting an initial value for a response waiting time, sending a CW to a tag after having sent out a command to the tag and waiting for a response from the tag, and by judging whether the response from the tag is received within the response waiting time.

If the response from the tag is received within the response waiting time, then sending the CW is stopped and the response waiting time is adjusted.

If the response from the tag is still not received beyond the response waiting time, then sending of the CW is stopped.

Here, setting an initial value for a response waiting time comprises setting the initial value of the response waiting time to an arbitrary value, which should be generally less than or equal to the maximum response waiting time (20 ms) provided in the protocol.

The above-mentioned command is a command used for instructing the tag to modify data and a flag bit in the tag, including a write command, a kill command, a lock command, a block-write command and a block-erase command.

The above-mentioned adjusting the response waiting time comprises recording the time from sending out the command to receiving the response from the tag, and adjusting the response waiting time according to the recorded time or adjusting the response waiting time according to the inherent information in the tag and/or the statistic information of the tag's operations. Here, the inherent information in the tag is the information determined during the tag's manufacturing process, which comprises at least the type and the serial number of the tag, the model number and manufacturer of the tag's chip and the statistical information of the tag's operations that is the information obtained by statistics during the process when the tag is performing various operations, which comprises at least the number of times of receiving the tag's response, the number of times for timeout, and the time recorded by the reader from sending out a command to receiving a response from the tag.

Particularly, the reader can be adjusted for the response waiting time in accordance with the following relationship: $T_{out}(n)=\alpha T_{out}(n-1)+(1-\alpha)T_s$, where, $T_{out}(n-1)$ is the response waiting time before the adjustment, and $T_{out}(n)$ is the response waiting time after the adjustment, $T_s$ is the recorded time from sending out the command to receiving the response from the tag, and $\alpha$ is an adjustment factor with a value range of [0, 1].

After the step of stopping the sending of the CW if the response from the tag is still not received beyond the response waiting time, it further comprises: adjusting the response waiting time.

Particularly, the response waiting time can be adjusted in accordance with the following relationship: $T_{out}(n)=\min(T_{out}(n-1)\times 2, 20\text{ ms})$, where, $T_{out}(n-1)$ is the response waiting time before the adjustment, and $T_{out}(n)$ is the response waiting time after the adjustment. Alternatively, the response waiting time can be adjusted in accordance with the following relationship: $T_{out}(n)=\min(T_{out}(n-1)+\lambda, 20\text{ ms})$, where, $T_{out}(n-1)$ is the response waiting time before the adjustment, $T_{out}(n)$ is the response waiting time after the adjustment, and $\lambda$ is a pre-set adjustment step length $\lambda$.

In accordance with the disclosed embodiments of the present invention, the reader comprises a response waiting time setting unit for pre-setting an initial value for a response waiting time, a command processing unit for sending out a command to a tag and sending a CW to the tag after having sent out the command, and waiting for a response from the tag. Here, if the response from the tag is received by the command processing unit within the response waiting time, then a response waiting time adjusting unit is triggered by the command processing unit to adjust the response waiting time. On the other hand, if the response from the tag is not received within the response waiting time, then sending of the CW is stopped.

The reader also includes a response waiting time adjusting unit for adjusting the response waiting time.

The above-mentioned command processing unit is further used for triggering the response waiting time adjusting unit to adjust the response waiting time when the response from the tag is not received within the response waiting time.

The above-mentioned response waiting time adjusting unit comprises: a response waiting time recording module for recording the time from sending out the command by the command processing unit to receiving the response from the tag and a response waiting time adjusting module for adjusting the response waiting time according to the time recorded by the response time recording module.

It can be seen from the above-mentioned method and reader for adjusting the transmission time of a CW that, in the disclosed embodiments of the present invention, the longest time for the reader to wait for a response from a tag is the response waiting time, which is far less than 20 ms. Consequently, the reader can find a command failure early, so as to send a new command to the tag as soon as possible. It can be seen from this that the method of the disclosed embodiments of the present invention can significantly improve the processing efficiency of an RFID system, thus improving the overall performance of the REID system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to make the objects, technical solutions and advantages of the present invention more apparent, the present invention is described in detail hereinbelow in conjunction with the accompanying drawings and particular embodiments, in which:

FIG. 1 is a flow chart of said method for adjusting the transmission time of a CW by a reader in accordance with the embodiments of the present invention; and FIG. 2 is a schematic diagram of the internal structure of said reader in the embodiments of the present invention.

DETAILED DESCRIPTION OF THE PREFERRED EMBODIMENTS

The disclosed embodiments of the present invention provide a method for adjusting the transmission time of a CW by a reader, with its processing procedure being illustrated in FIG. 1. The method comprises setting an initial value for the response waiting time, as indicated in Step 101.

In accordance with the contemplated embodiment, the response waiting time corresponds to the longest time for the reader to wait for a response from a tag, and if the reader does not receive the response from the tag beyond the corresponding waiting time after it has sent out a command, then the reader will still stop sending the CW and prepare to send a new command to the tag.

It should be appreciated that, in this step, the user can set the initial value of the response waiting time to an arbitrary value, which should be generally less than or equal to the maximum response waiting time 20 ms as provided for in the protocol. For example, the user can designate the initial value of the response waiting time according to the inherent information in the tag (for example, the information determined in the tag's manufacturing process, such as the type and the serial number of the tag, the model number and/or manufacturer of the tag's chip) or the past experiences, or directly set the initial value of the response waiting time to the maximum value specified in the RFID protocol, i.e., 20 ms.

A CW is sent to a tag after a command has been sent out to it and at the same time wait for a response from the tag, as indicated in Step 102.

In accordance with the contemplated embodiment, the above-mentioned tag should be a tag which is in an Open/Secure state. Moreover, the above-mentioned command sent by the reader to the tag is used for instructing the tag to modify data and a flag bit located therein, such as a write command, a kill command, a lock command, a block-write command or a block-erase command.

As previously mentioned, in an RFID system, when the distance between a tag and reader is less than the tag reading range of the reader, the reader will start a process for identifying the tag's ID. After having successfully identified the ID of the tag, the tag will enter an Open/Secure state, and at this moment, the reader may send a corresponding instruction to the tag in the Open/Secure state to instruct the tag to perform the corresponding operation. Part of these commands are used for instructing the tag to modify the data and the internal flag bit, including a write command, a kill command, a lock command, a block-write command and/or a block-erase command, and the reader will continue to send a CW to the tag and wait for its response after having sent out the above-mentioned write, kill, lock, block-write or block-erase command. According to the provisions of the current RFID protocol, after having sent out the above-mentioned command, the reader will send a CW to the tag for up to 20 ms, i.e., the longest time for the reader to wait for a response from the tag is 20 ms.

A determination is made to determine whether the response from the tag is received within the response waiting time, as indicated in Step 103. If the response from the tag is received within the response waiting time, then step 104 is performed. If the response from the tag is still not received beyond the response waiting time, then step 106 is performed.

As indicated in Step 104, the sending of the CW is then stopped.

Next, the response waiting time is adjusted, as indicated in step 105. Here, various methods can be employed to re-evaluate the response waiting time. For example, the reader can adjust the response waiting time according to at least one piece of the inherent information in the tag and/or the statistic information of the tag's operations. In this case, the inherent information in the tag includes the information determined in the tag's manufacturing process, such as the type and the serial number of the tag, the model number and/or manufacturer of the tag's chip. The statistical information of the tag's operations includes: the information obtained by statistics during the process when the tag is performing various operations, such as the number of times of receiving the tag's response, the number of times of timeout (i.e., the number of times that the tag's response is not received), and/or the time recorded by the reader from sending out a command to receiving a response from the tag.

During the process for adjusting the response waiting time, the reader can either increase or reduce the above-mentioned response waiting time, and can even keep the response waiting time constant in an extreme situation.

In preferred embodiments of the present invention, a method is provided for adjusting the response waiting time, which method comprises: after having stopped sending the CW, the reader records the time from sending out the command to receiving the response from the tag and adjusts the response waiting time according to the recorded time.

The method for adjusting the response waiting time by the reader according to the recorded time will be described hereinbelow by way of examples. In one example, assuming that $T_{out}(n-1)$ represents the response waiting time before the adjustment, $T_{out}(n)$ represents the response waiting time after the adjustment, $T_s$ is the time recorded by the reader from sending out the command to receiving the response from the tag, then the response waiting time $T_{out}(n)$ after the adjustment can be obtained by performing a calculation in accordance with the following relationship:

$$T_{out}(n)=\alpha T_{out}(n-1)+(1-\alpha)T_s \qquad \text{Eq. (1)}$$

where, $\alpha$ is an adjustment factor with a value range of [0, 1].

It should be appreciated that, in this example, the initial value of the response waiting time should generally be set to less than or equal the longest waiting time (20 ms) as provided for in the protocol.

After adjusting the response waiting time, the reader can return to step 102 or end this access and start a new round of read/write operations.

In step 106, where sending the CW is stopped, the reader can also further adjust the response waiting time after having stopped sending the CW. Since the reason for the reader not to receive a response from the tag may be due to the fact that the response waiting time is too short, the adjustment performed in this step is generally to increase the response waiting time.

Here, the reader can adjust the response waiting time in accordance with the following relationship, i.e., taking the minimum value between twice the response waiting time before the adjustment and 20 ms, where the operator min[ ] represents the operation of taking the minimum value.

$$T_{out}(n)=\min[T_{out}(n-1)\times 2, 20\text{ ms}] \qquad \text{Eq. (2)}$$

Additionally, for example, an adjusting step length $\lambda$ can be pre-set. Then, in this step, the reader can adjust the response waiting time in accordance with the following relationship, i.e., taking the minimum value between the sum of the response waiting time before the adjustment and the adjustment step length and 20 ms, where the operator min[ ] represents the operation of taking the minimum value.

$$T_{out}(n)=\min[T_{out}(n-1)+\lambda, 20\text{ ms}] \qquad \text{Eq. (3)}$$

After performing step 106, the reader can return to step 102 or end this access and start a new round of read/write operations.

According to the provisions of the RFID protocol, there are two types of responses returned by a tag to a reader. One response is an operation success response returned by the tag after it has performed the operation successfully. The other response is an operation failure response returned by the tag with an error code after it has failed to perform the operation. In the disclosed embodiments of the present invention, the reader can record only the response time of the responses for successful operations but not the response time of the responses for failed operations. In this way, in the above-mentioned step 103, the reader also needs to judge whether a response for a successful operation from the tag is received. If yes, then step 104 is performed. If a response for a failed operation is received from the tag, then step 106 is performed.

Besides the above-mentioned method for adjusting the transmission time of a CW, the embodiments of the present invention further provide a reader 200 for implementing the method. The internal structure of this reader 200 is illustrated in FIG. 2, which mainly includes: a response waiting time setting unit 210 for pre-setting an initial value for a response waiting time, a response waiting time adjusting unit 230 for adjusting the response waiting time and a command processing unit 220 for sending out a command to a tag in the Open/Secure state and for sending a CW to the tag after having sent out the command and waiting for a response from the tag. Here, if the response from the tag is received by the command processing unit 220 within the response waiting time, then the response waiting time adjusting unit 230 is triggered by the command processing unit 220 to adjust the response waiting time. If the response from the tag is not received within the response waiting time, then sending of the CW is stopped Furthermore, if the command processing unit 220 does not receive the response from the tag within the response waiting time, then the command processing unit 220 can also trigger the response waiting time adjusting unit 230 to adjust the response waiting time.

The above-mentioned response waiting time adjusting unit comprises a response time recording module for recording the time from sending out the command by the command processing unit to receiving the response from the tag, and a response waiting time adjusting module for adjusting the response waiting time according to the time recorded by the response waiting time recording module.

As mentioned above, if the command processing unit 220 receives a response from the tag within the response waiting time, then the response waiting time adjusting module can adjust the response waiting time in accordance with the above-mentioned relationship of equation (1). On the other hand, if the command processing unit 220 does not receive a response from the tag within the response waiting time, then the response waiting time adjusting module can adjust the response waiting time in accordance with the above-mentioned relationships of equation (2) or (3).

Based on the above-described evaluation method, the skilled person can appreciate that the response waiting time obtained by the evaluation is less than 20 ms. Statistical analysis has shown that the response time from sending out a command to receiving a response from the tag is generally related to factors such as the transmitting power of the reader and the distance between the reader and the tag, which is generally less than 8 ms. Consequently, in accordance with the presently contemplated embodiment, the response waiting time obtained by evaluating the response time will be far less than 20 ms.

Moreover, the above-mentioned method and reader for adjusting the transmission time of a CW in accordance with the embodiments of the present invention establish the longest time for the reader to wait for a response from the tag as the response waiting time, which is far less than 20 ms. As a result, the reader can find a command failure early so as to send a new command to the tag as early as possible. The method of the disclosed embodiments of the present invention can significantly improve the processing efficiency of an RFID system, so as to improve the performance of the RFID system.

Furthermore, the method of the disclosed embodiments of the present invention only needs to perform slight modifications to a reader, without the need to make any changes to a tag, and therefore the method is easily implemented in an RFID system.

What are described above are merely preferred embodiments of the present invention, and are not intended to limit the present invention, and any modification, equivalent substitution and improvement made within the spirit and principle of the present invention should be contained in the protective scope of the present invention.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for adjusting a transmission time of a continuous wave (CW), comprising:
    setting an initial value for a response waiting time;
    sending the CW to a tag after sending a command to the tag and waiting for a response from the tag; and
    judging whether the response from the tag is received within the response waiting time, wherein if the response from the tag is received within the response waiting time, then stopping sending the CW, recording a time from sending out the command to receiving the response from the tag and adjusting the response waiting time according to the recorded time; and
    wherein if the response from the tag is not received beyond the response waiting time, then stopping sending of the CW.

2. The method as claimed in claim 1, wherein said step of setting an initial value for a response waiting time comprises setting an initial value of the response waiting time to an arbitrary value.

3. The method as claimed in claim 2, wherein said arbitrary value is one of less than and equal to a maximum response waiting time provided in a radio frequency identification protocol.

4. The method as claimed in claim 1, wherein said command is a command instructing the tag to modify one of data or a flag bit in the tag.

5. The method as claimed in claim 4, wherein said command instructing the tag to modify the one of data or the flag bit in the tag comprises one of a write command, a kill command, a lock command a block-write command and a block-erase command.

6. The method as claimed in claim 1, wherein said adjusting the response waiting time according to the recorded time comprises adjusting the response waiting time in accordance with the following relationship:

$$T_{out}(n)=CtT_{out}(n-1)+(1-\alpha)T_s,$$

wherein $T_{out}(n-1)$ is the response waiting time before the adjustment,
Tout, (n) is the response waiting time after the adjustment,
$T_s$ is the recorded time from sending out the command to receiving the response from the tag, and $\alpha$ is an adjustment factor with a value range of [0, 1].

7. The method as claimed in claim 1, wherein said adjusting the response waiting time comprises adjusting the response waiting time in accordance with at least one of at least one piece of inherent information in the tag and statistical information of the tag's operations.

8. The method as claimed in claim 7, wherein said inherent information in the tag is information determined during the tag's manufacturing process, said information comprising at least a type and a serial number of the tag, a model number and manufacturer of the tag's chip; and
    said statistical information of the tag's operations is the information obtained statistically during a process when the tag is performing various operations, the statistical information comprising at least a number of times of receiving the tag's response, a number of times for timeout, and a time recorded by the reader from sending out a command to receiving a response from the tag.

9. The method as claimed in claim 1, further comprising subsequent to the response from the tag is being not received beyond the response waiting time, stopping sending the CW and adjusting the response waiting time.

10. The method as claimed in claim 9, wherein said adjusting the response waiting time comprises increasing the response waiting time.

11. The method as claimed in claim 10, wherein said increasing the response waiting time comprises:
    adjusting the response waiting time according to the following equation:

$$T_{out}(n)=\min[T_{out}(n-1)\times2, 20\text{ ms}],$$

wherein $T_{out}(n-1)$ represents the response waiting time before the adjustment, $T_{out}(n)$ represents the response waiting time after the adjustment, and min represents an operation of taking a minimum value.

12. The method as claimed in claim 10, wherein said increasing the response waiting time comprises:
adjusting the response waiting time in accordance with the following relationship:

$$T_{out}(n) = \min[T_{out}(n-1) + \lambda, 20\ ms],$$

wherein $T_{out}(n-1)$ represents the response waiting time before the adjustment, $T_{out}(n)$ represents the response waiting time after the adjustment, $\lambda$ is a pre-set adjusting step length $\lambda$, and min represents an operation of taking a minimum value.

13. A reader, comprising: a response waiting time setting unit for pre-setting an initial value for a response waiting time; a command processing unit for sending out a command to a tag and sending a continuous wave (CW) to the tag after sending the command and waiting for a response from the tag; and a response waiting time adjusting unit for adjusting the response waiting time, the response waiting time adjusting unit comprising: a response waiting time recording module for recording the time from sending out the command by the command processing unit to receiving the response from the tag; and a response waiting time adjusting module for adjusting the response waiting time according to the time recorded by the response waiting time recording module; wherein if the response from the tag is received by the command processing unit within the response waiting time, a response waiting time adjusting unit is triggered to adjust the response waiting time according to the time recorded by the response waiting time recording module; and wherein if the response from the tag is not received within the response waiting time, sending of the CW is stopped.

14. The reader as claimed in claim 13, wherein said command processing unit further triggers the response waiting time adjusting unit to adjust the response waiting time when the response from the tag is not received within the response waiting time.

* * * * *